(12) United States Patent
Marques et al.

(10) Patent No.: US 7,933,452 B2
(45) Date of Patent: Apr. 26, 2011

(54) SYSTEM AND METHODS OF IMAGE RETRIEVAL

(75) Inventors: Oge Marques, Boca Raton, FL (US);
Liam Mayron, Boca Raton, FL (US)

(73) Assignee: Florida Atlantic University, Boca Raton, FL (US)

( * ) Notice: Subject to any disclaimer, the term of this patent is extended or adjusted under 35 U.S.C. 154(b) by 773 days.

(21) Appl. No.: 12/001,682

(22) Filed: Dec. 11, 2007

(65) Prior Publication Data

US 2008/0205795 A1    Aug. 28, 2008

Related U.S. Application Data

(60) Provisional application No. 60/869,503, filed on Dec. 11, 2006.

(51) Int. Cl.
*G06K 9/46*    (2006.01)
(52) U.S. Cl. ........ 382/190; 382/142; 382/143; 382/144; 382/145; 382/146; 382/147; 382/148; 382/149; 382/150; 700/117; 348/125; 348/126
(58) Field of Classification Search .................. 382/190, 382/142, 143, 144, 145, 146, 147, 148, 149, 382/150; 700/117; 348/125, 126
See application file for complete search history.

(56) References Cited

U.S. PATENT DOCUMENTS

| 6,690,729 | B2 * | 2/2004 | Hayashi | 375/240.16 |
| 2003/0063673 | A1 * | 4/2003 | Riemens et al. | 375/240.16 |
| 2007/0025442 | A1 * | 2/2007 | Okada et al. | 375/240.03 |

* cited by examiner

*Primary Examiner* — Matt Bella
*Assistant Examiner* — Mike Rahmjoo
(74) *Attorney, Agent, or Firm* — Novak, Druce + Quigg LLP; Gregory A. Nelson; Eduardo J. Quinones

(57) ABSTRACT

A visual image retrieval system is provided. The system includes an image database for storing images. The system also includes a preprocessor communicatively linked to the image database for segmenting the images and generating based upon segmented images a region-of-interest (ROI) extraction output. Additionally, the system includes an ROI feature extraction module for computing ROI feature vectors based upon the output, and a global feature extraction module for computing global feature vectors based upon the output. The system further includes an ROI feature vectors database for storing the ROI feature vectors, and a global feature vectors database for storing the global feature vectors. The system also includes a perceptually-relevant image search machine (PRISM) interface for displaying query images and retrieved images, the retrieved images being retrieved in response to a user selecting at least one displayed query image. The system also includes a search-and-retrieval module for searching and retrieving stored images for display with the PRISM interface in response to a user selecting at least one displayed query image, and a global/ROI search module for selecting between a global search or an ROI search if more than one query image is selected, and for trigging the selected search.

4 Claims, 2 Drawing Sheets

US 7,933,452 B2

SYSTEM AND METHODS OF IMAGE RETRIEVAL

CROSS-REFERENCE TO RELATED APPLICATIONS

This application claims the benefit of U.S. Provisional Patent Application No. 60/869,503, which was filed Dec. 11, 2006, and which is incorporated herein in its entirety.

FIELD OF THE INVENTION

The present invention is related to the field of image processing, and more particularly, to computer-based image retrieval and image manipulation.

BACKGROUND OF THE INVENTION

Various computer-based approaches to retrieving images in response to image queries have been proposed. Content-based image retrieval (CBIR), for example, analyzes the content of an image in order to retrieve relevant images based on the respective content of images. A newer approach is content-free image retrieval (CFIR), which retrieves images based upon past user associations, regardless of the specific content of the images. Images can also be semantically annotated, according to another approach, so that the semantically annotated images can be organized and retrieved based on human-generated textual information.

These various approaches each have unique advantages, yet in different contexts also have distinct limitations. Accordingly, there is a need for a system that provides a user the option of selecting among and using different retrieval approaches depending on the particular context of a user's image query.

More fundamentally, a significant limitation of conventional image retrieval systems in many contexts is the typically limited image query capabilities of such systems. The limitations of conventional systems can significantly reduce the effectiveness of even sophisticated back-end systems. Thus, there also is a need for a system that provides the user greater flexibility in formulating image queries.

SUMMARY OF THE INVENTION

The present invention provides a system, referred to herein as a Perceptually-Relevant Image Search Machine (PRISM), an interface and related methods that enable a user to group, scale, and annotate images. An object of the invention is to provide a mechanism by which a user formulate more expressive image queries that better reflect the intent of the user rather than the capabilities of the computer system on which the image retrieval is executed and that provide a variety of interpretation options.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

One aspect of the invention is a computer-based system for retrieving images in response to image queries. As defined herein, the system is a Perceptually-Relevant Image Search Machine (PRISM) that allows a user to spatially organize images, for example, by placing related images together or in close proximity. The system also allows the user to scale images so that the relative size of an image reflects its relevance to the user. Additionally, the system allows the user to annotate the images.

Another aspect of the invention is a tabbed interface that allows a user to group images in multiple, distinct groups. Multiple users, moreover, can simultaneously and independently organize images. The system can derive information from multiple users, and different user sessions can be pooled for enhanced image analysis.

Figure 1:
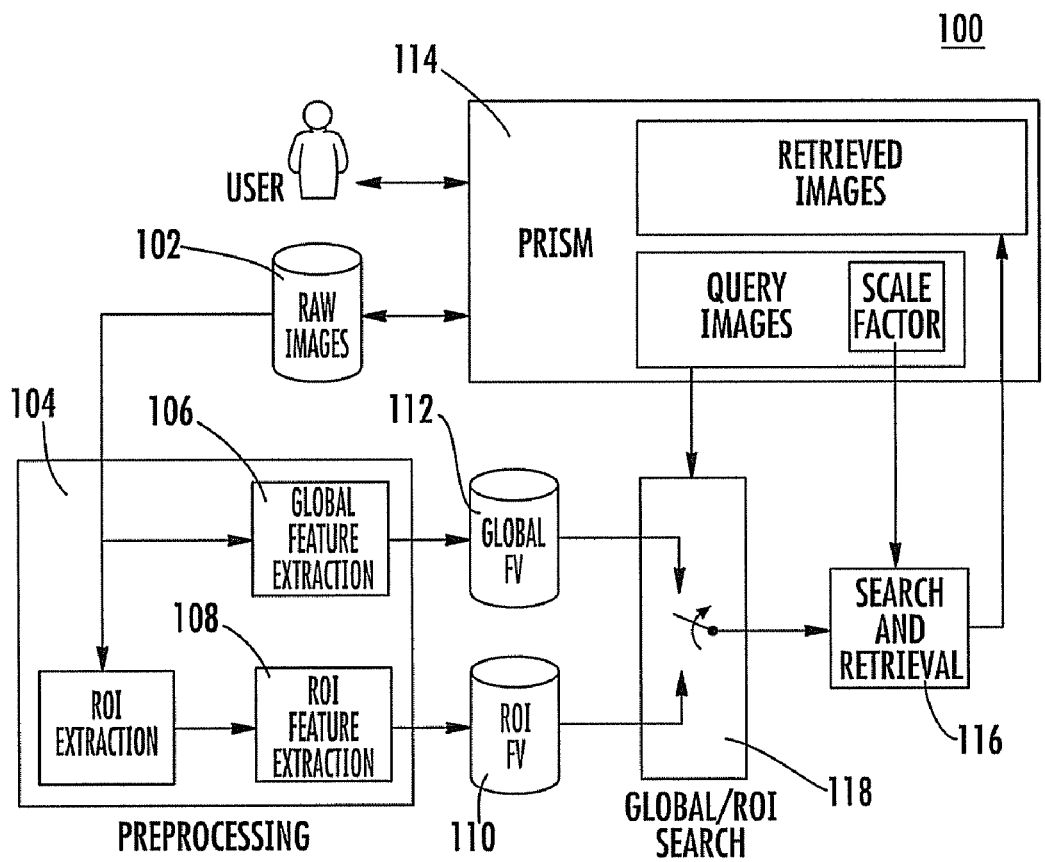
FIG. 1 is a schematic view of system, defining a Perceptually-Relevant Image Search Machine (PRISM), for retrieving images in response to image queries, according to one embodiment of the invention.

FIG. 1 is a schematic view of system 100 for retrieving images in response to image queries, according to one embodiment of the invention. The system 100 includes an image database for storing images 102, and a preprocessor 104 communicatively linked to the image database for segmenting the images and generating, based upon segmented images, a region-of-interest (ROI) extraction output. The system 100 further includes an ROI feature extraction module 106 for computing ROI feature vectors based upon the output, and a global feature extraction module 108 for computing global feature vectors based upon the output. Additionally, the system 100 includes an ROI feature vectors database 110 for storing the ROI feature vectors, and a global feature vectors database 112 for storing the global feature vectors.

The system also includes a perceptually-relevant image search machine (PRISM) interface 114 for displaying query images and retrieved images, the retrieved images being images that are retrieved in response to a user selecting at least one displayed query image. The system 100 further includes search-and-retrieval module 116 for searching and retrieving stored images for display with the PRISM interface 114 in response to a user selecting at least one displayed query image. Additionally, the system includes a global/ROI search module 118 for selecting between a global search or an ROI search if more than one query image is selected, and for trigging the selected search.

Figure 2:
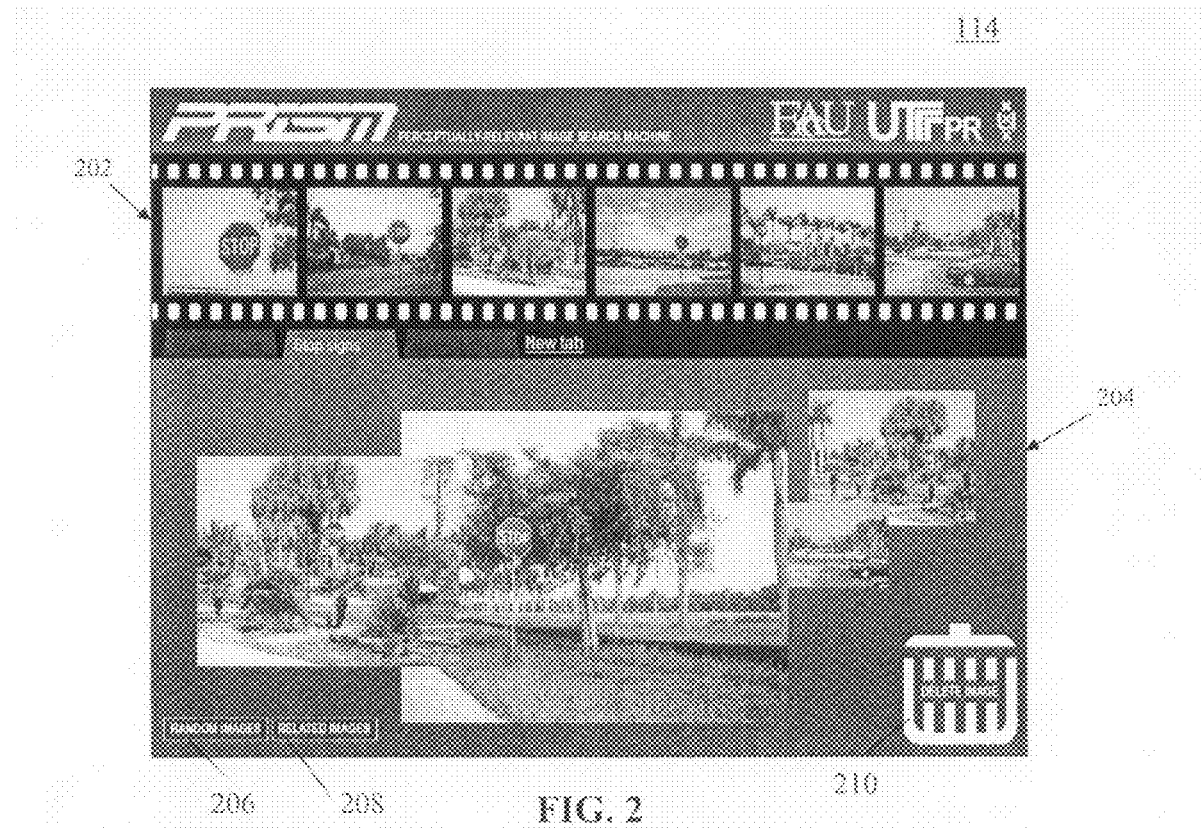
FIG. 2 is an exemplary view of a Perceptually-Relevant Image Search Machine (PRISM) interface, according to another embodiment of the invention.

FIG. 2 is an exemplary view of the PRISM interface 114. The PRISM interface 114 comprises a top portion and a lower portion. The top portion 202 of the PRISM interface 114 provides a "filmstrip" of images 202, the source of new images in the PRISM interface. According to one embodiment, a user drags images from the filmstrip into anywhere on the main content area. An image may be deleted from the filmstrip by dragging it to the trash can icon in the lower-right corner of the screen. Preferably, when an image is removed from the filmstrip, the vacant space is filled with a new image so that the filmstrip is always full.

The lower portion of the PRISM interface 114 comprises a tabbed content area (referred to herein as the workspace) 204. It is within this area that images are organized. The organized images form the basis for the content-based, content-free, and semantic queries that may be posed using the system 100. The tabs can expand and segment the functional area while occupying a minimal amount of space. In the PRISM interface 114, the tabs are used to organize individual groups of images, expanding the total available work area, while avoiding overwhelming a user with too many images that are all visible at once. At the bottom left are two buttons 206, 208 labeled "Random Images" and "Related Images," respectively. Both of these buttons can empty the filmstrip and replace it with either random images from the image database, or relevant images. To the right is a trash can icon 210. Images can be deleted directly from the filmstrip, or from the workspace after they have been placed.

The workspace 204 is used for arranging images. Images can be placed anywhere and moved to new locations after their initial assignment by clicking and dragging. A user can place related images in an overlapping, adjacent, or close-proximity arrangement. It can be inferred that images that are placed closer together within a tab and, to a lesser degree, images that share a tab, are related. This functionality enables content-free queries. If, across many users, the same images occur together, then their likelihood of being related increases. This can be judged regardless of content (hence, content-free).

Within the workspace 204 images can also be scaled larger or smaller, allowing users to make more relevant and important images larger, and vice versa. In content-based queries larger images can be given more weight. This capability enables a type of relevance feedback.

Finally, the workspace 204 allows the annotation of individual images (as well as the tabs to which the images belong). Previously annotated images (by the same user or other users) can be recalled based on an analysis of the annotations in the current workspace.

Operatively, during an offline preprocessing stage, images are segmented by the preprocessor 104. Preferably, the segmentation is effected based upon an attention-driven ROI extraction algorithm implemented by the preprocessor 104. These segmented, salient areas can correspond to semantic objects in the images. Using, the ROI extraction algorithm, moreover, the outputs of two computational models of visual attention are combined over a set of morphological operations. The result is the region of interest. One aspect of the algorithm-based procedure performed is that no a priori object information such as shape or color is used. Rather the algorithm-based procedure executes in a wholly unsupervised manner.

After ROI extraction, the ROI and global feature vectors (FVs) are computed by the feature extraction modules 106, 108. For example, both can use the same descriptor, a 256-cell quantized HMMD (MPEG-7-compatible) color histogram. The computed FVs are stored in the ROI and global FV databases 110, 112.

If more than one query image is presented in the PRISM interface 114 workspace a decision process occurs. The global/ROI search module 118 selects the global or ROI information for search and retrieval module input. This block compares the query images' features and triggers a global- or ROI-based search.

Figure 3:
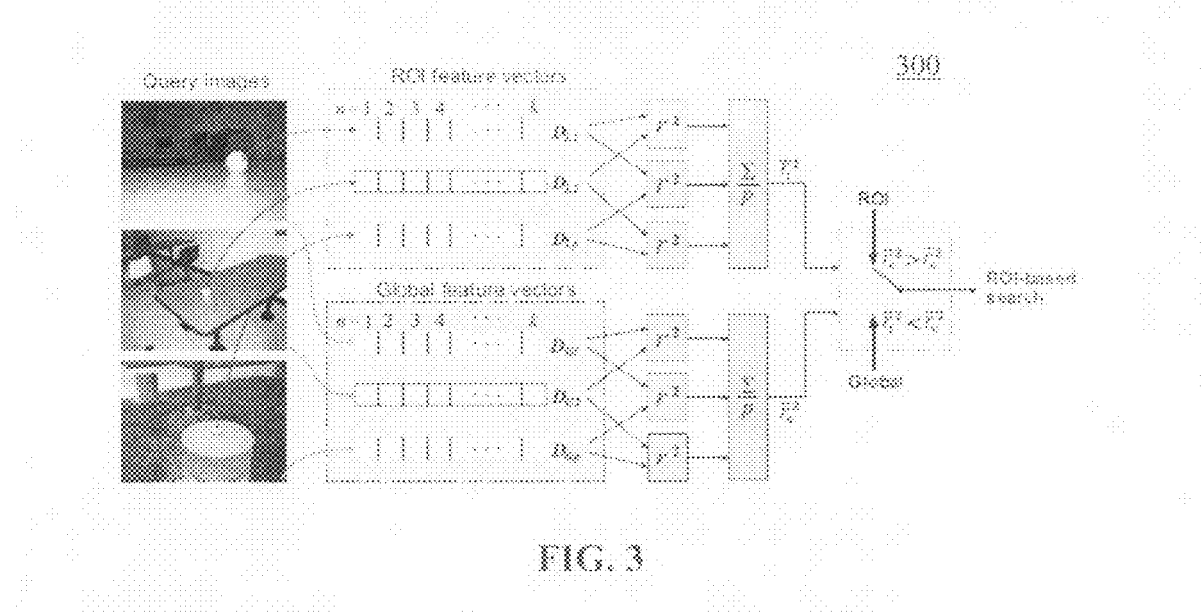
FIG. 3 is a schematic representation of certain operative procedures performed by the system of FIG. 1

FIG. 3 depicts the operative aspects of a PRISM system. Illustratively, in the exemplary images of tennis balls at the left of the figure, a user's ROI-based search intention is clear, since the features of the tennis balls (ROIs) are more similar within themselves than the global features between themselves. A simple approach is used for detecting the degree of similarity of the feature vectors based on the average coefficient of determination (squared correlation, $r^2$). The $r^2$ ranges from 0 to 1 and represents the magnitude of the linear relationship between two vectors.

Given $p(>1)$ query images, two independent groups of k-positions (k=256) feature vectors are considered: one from the ROIs (L), $D_{Li}(n)$, and other from the global images (G), $D_{Gi}(n)$, where i is the query image, with $i \in \{1, \ldots, p\}$ and $n \in \{1, \ldots, k\}$. Within each group, the coefficient of determination, $r_s^2(c)$, for all feature vectors pairs is computed:

$$r_s^2(c) = \frac{\left[k \sum_{n=1}^{k} D_{sx}(n) D_{sy}(n) - \sum_{n=1}^{k} D_{sx}(n) \sum_{n=1}^{k} D_{sy}(n)\right]^2}{\left[k \sum_{n=1}^{k} [D_{sx}(n)]^2 - \left[\sum_{n=1}^{k} D_{sx}(n)\right]^2\right]\left[k \sum_{n=1}^{k} [D_{sy}(n)]^2 - \left[\sum_{n=1}^{k} D_{sy}(n)\right]^2\right]}$$

where s denotes the group, with $s \in \{L, G\}$ and c is the number of combinations of the p feature vectors, taken 2 at a time (x and y). $c \in \{1, \ldots, C_p^2\}$, where $$C_p^2 = \frac{p!}{2(2-p)}.$$

The average coefficients of determination, $\bar{r}_s^2$, of each group are then compared. The higher the group $\bar{r}_s^2$, the more similar the feature vectors within it are, and hence the more similar the corresponding raw data.

Once the search type is set, search and retrieval procedures can finally be performed. In the first step, individual retrievals of a fixed number of t images are made for each query. The distance between $Q_i$ FV, $D_i(n)$, and all database images' FVs, $D_b(n)$ is computed using the L1 measure:

$$L1_i(b) = \sum_{n=1}^{k} |D_i(n) - D_b(n)|,$$

where i is the query image and b the database image. The t most relevant images are ranked from the most similar (smaller distance) to the least similar, according to $$R_{ih} = t - h + 1,$$

where h is the retrieved image, with $h \in \{1, \ldots, t\}$. These individual retrieval results are then grouped into the final retrieval.

The system looks at a user's subjective degree of relevance, represented by query images scales captured by PRISM. This is achieved using the scale factor (perceptual resize) of $Q_i$ as a weight $W_i$, which is multiplied by each rank $R_{ih}$. The result of this weighting operation is a relevance score $$S_j = W_i R_{ih},$$

where j is the image into the final retrieval, with $j \in \{1, \ldots, u\}$ and u is the number of different images among all individual retrievals. If the same image appears in different retrievals, the $S_j$ are summed, so as to increase its relevance and assure a single occurrence of this image into the final retrieval. In the case of images with the same $S_j$, the tie is broken according to the following criteria:

If the images come from individual retrievals with different $W_i$, the one with the grater $W_i$ is considered more relevant.

If the images come from individual retrievals with the same $W_i$, the most relevant is the one which was queried first (its correspondent query image being pushed first into the workspace).

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as a computer-readable storage medium which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A visual image retrieval system, comprising:
   an image database for storing images;
   a preprocessor communicatively linked to the image database for segmenting the images and generating based upon segmented images a region-of-interest (ROI) extraction output;
   an ROI feature extraction module for computing ROI feature vectors based upon the output;
   global feature extraction module for computing global feature vectors based upon the output;
   an ROI feature vectors database for storing the ROI feature vectors;
   a global feature vectors database for storing the global feature vectors;
   a perceptually-relevant image search machine (PRISM) interface for displaying query images and retrieved images, wherein retrieved images are images retrieved in response to a user selecting at least one displayed query image;
   a search-and-retrieval module for searching and retrieving stored images for display with the PRISM interface in response to a user selecting at least one displayed query image;
   a global/ROI search module for selecting between a global search or an ROI search if more than one query image is selected, and for trigging the selected search.

2. The system of claim 1, wherein the global/ROI search module is configured to select between the searches by determining a degree of similarity of feature vectors, wherein the degree of similarity is based upon an average coefficient of determination.

3. The system of claim 1, wherein the preprocessor is configured to segment the images based upon an attention-driven ROI extraction algorithm.

4. The system of claim 3, wherein the ROI extraction algorithm combines outputs based upon two computation models of visual attention over a set of morphological operations.

* * * * *

UNITED STATES PATENT AND TRADEMARK OFFICE
CERTIFICATE OF CORRECTION

PATENT NO. : 7,933,452 B2
APPLICATION NO. : 12/001682
DATED : April 26, 2011
INVENTOR(S) : Oge Marques, Liam Mayron and Gustavo Borba It is certified that error appears in the above-identified patent and that said Letters Patent is hereby corrected as shown below:

Title page, item [75] inventors, add the following inventors:

Gustavo Borba, Curitiba, Paraná (BR)

Signed and Sealed this
Seventeenth Day of January, 2012

David J. Kappos
*Director of the United States Patent and Trademark Office*